US010066425B2

(12) United States Patent
Saikawa et al.

(10) Patent No.: US 10,066,425 B2
(45) Date of Patent: Sep. 4, 2018

(54) CONSOLE APPARATUS FOR AUTOMOBILE

(71) Applicant: Honda Motor Co., Ltd., Tokyo (JP)

(72) Inventors: Naoki Saikawa, Saitama (JP); Takaaki Sakaguchi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/488,527

(22) Filed: Apr. 17, 2017

(65) Prior Publication Data
US 2017/0306664 A1 Oct. 26, 2017

(30) Foreign Application Priority Data

Apr. 22, 2016 (JP) ................................ 2016-085939

(51) Int. Cl.
B60R 7/04 (2006.01)
B60N 2/75 (2018.01)
E05B 83/32 (2014.01)
B60N 3/10 (2006.01)

(52) U.S. Cl.
CPC .............. E05B 83/32 (2013.01); B60N 2/773 (2018.02); B60N 2/793 (2018.02); B60N 3/102 (2013.01); B60R 7/04 (2013.01)

(58) Field of Classification Search
CPC ........... B60R 7/04; E05B 83/32; B60N 2/773; B60N 2/793; B60N 3/102
USPC ...................................................... 296/24.34
See application file for complete search history.

(56) References Cited

U.S. PATENT DOCUMENTS

| 4,934,750 A * | 6/1990 | Eichler ................ B60N 2/4646 224/275 |
| 7,029,049 B2 * | 4/2006 | Rockafellow ........ B60N 2/4626 296/1.09 |
| 8,235,442 B2 * | 8/2012 | Spitler ...................... B60R 7/04 296/24.34 |
| 2007/0152461 A1 * | 7/2007 | Joler ........................ B60R 7/04 296/24.34 |

(Continued)

FOREIGN PATENT DOCUMENTS

| JP | 2004217118 | 8/2004 |
| JP | 2006-138155 | 6/2006 |
| JP | 2009126304 | 6/2009 |

OTHER PUBLICATIONS

"Office Action of Japan Counterpart Application" with English translation thereof, dated Dec. 19, 2017, p. 1-p. 5, in which the listed reference was cited.

(Continued)

Primary Examiner — Gregory A Blankenship
(74) Attorney, Agent, or Firm — JCIPRNET

(57) ABSTRACT

A console apparatus for an automobile includes: a console main body (11), disposed between a left seat and a right seat of the automobile; arm rests (15a, 15b), supported at the console main body (11) in a manner of being capable of sliding in the front-rear direction of the automobile; a locking unit, locking the forward slide of the arm rests (15a, 15b) when the arm rests (15a, 15b) are located at a moving rear end position (P2); an unlocking unit, unlocking the arm rests (15a, 15b) locked by the locking unit at the moving rear end position (P2) according to an unlocking operation; and a force applying unit, applying a forward force to the arm rests (15a, 15b) when the arm rests (15a, 15b) are located at the moving rear end position (P2).

4 Claims, 13 Drawing Sheets

(56) References Cited

U.S. PATENT DOCUMENTS

| | | | |
|---|---|---|---|
| 2007/0176448 A1* | 8/2007 | Spykerman | B60K 20/02 296/24.34 |
| 2007/0176449 A1* | 8/2007 | Kukucka | B60N 2/4646 296/24.34 |
| 2009/0066102 A1* | 3/2009 | Shiono | B60R 7/04 296/24.34 |
| 2009/0066103 A1* | 3/2009 | Koarai | B60N 2/4606 296/24.34 |
| 2010/0066113 A1* | 3/2010 | Browne | B60N 2/4646 296/24.34 |
| 2010/0156129 A1* | 6/2010 | Evans | B60R 7/04 296/24.34 |
| 2010/0207414 A1* | 8/2010 | Tsuda | B60N 2/4646 296/37.8 |
| 2011/0227359 A1* | 9/2011 | Fesenmyer | B60N 2/4606 296/24.34 |
| 2013/0062899 A1* | 3/2013 | Stoia | B60N 2/4646 296/24.34 |
| 2014/0138975 A1* | 5/2014 | Washio | B60N 2/4646 296/24.34 |
| 2014/0175820 A1* | 6/2014 | Lechkun | B60N 3/00 296/24.34 |
| 2015/0258923 A1* | 9/2015 | Skapof | B60N 2/4606 296/24.34 |
| 2016/0339847 A1* | 11/2016 | Kodama | B60R 7/04 |
| 2017/0306664 A1* | 10/2017 | Saikawa | B60N 2/4646 |

OTHER PUBLICATIONS

"Office Action of Japan Counterpart Application," dated May 8, 2018, with English translation thereof, p. 1-p. 4.

* cited by examiner

CONSOLE APPARATUS FOR AUTOMOBILE

CROSS-REFERENCE TO RELATED APPLICATION

This application claims the priority benefit of Japan application serial no. 2016-085939, filed on Apr. 22, 2016. The entirety of the above-mentioned patent application is hereby incorporated by reference herein and made a part of this specification.

BACKGROUND OF THE DISCLOSURE

1. Field of the Disclosure

The disclosure generally relates to a console apparatus for an automobile.

2. Description of Related Art

In a console apparatus for an automobile, arranged between a left seat and a right seat of front row separated seats of the automobile, the following console apparatus for the automobile is already provided, the console apparatus for the automobile is provided with a left arm rest and a right arm rest at the upper surface of a console main body, and at least one of the left and right arm rests can slide back and forth relative to the console main body (e.g. referring to Japanese Laid-Open Patent Publication No. 2004-217118).

SUMMARY OF THE DISCLOSURE

Problems to be Solved by the Disclosure

With respect to the console apparatus for the automobile, although there are descriptions showing that the arm rest (slide component) has a slide locking mechanism, there is no description associated with the operation of the slide locking mechanism and the like. For the console apparatus for the automobile, for example, in a case where a passenger having a short stature seated in the front row wants to operate the arm rest, hands of the passenger cannot reach the arm rest in a state that the arm rest slides to the rear side. Therefore, the console apparatus for the automobile has the following problems: when the arm rest slid to the rear side is to be returned to the front side, a composite action is necessary in which an unlocking operation member is operated while in the arm rest is driven to slide forwards at the same time, thus it is difficult to move the arm rest forwards.

Accordingly, the disclosure provides a console apparatus for the automobile having the slide component capable of sliding back and forth, the slide component can be easily moved forwards in the state that the slide component slides to the rear side.

Technical Means for Solving the Problems

For solving the foregoing problems, according to an exemplary embodiment of the disclosure, a console apparatus for an automobile is provided and including: a console main body (for example, a console main body 11 of an embodiment), disposed between a left seat and a right seat (for example, a driver seat 3 and a copilot seat 4 of the embodiment) of the automobile (for example, the automobile 1 of the embodiment); a slide component (for example, an arm rest 15 of the embodiment), supported at the console main body in a manner of being capable of sliding in the front-rear direction of the automobile; a locking unit (for example, a locking mechanism 45 of the embodiment), for locking the forward slide of the slide component when the slide component is located at a rear moving position (the moving rear end position P2 of the embodiment); an unlocking unit (for example, an unlocking mechanism 46 of the embodiment), for unlocking the slide component locked by the locking unit at the rear moving position according to an unlocking operation; and a force applying unit (for example, a force applying mechanism 47 of the embodiment), applying a forward force to the slide component when the slide component is located at the rear moving position and making the slide component slide forwards when the locking of the slide component at the rear moving position is unlocked.

According to another exemplary embodiment of the disclosure, the unlocking unit includes an unlocking button (for example, an unlocking button 35 of the embodiment), and the locking of the slide component at the rear moving position is unlocked by pushing the unlocking button rearwards.

According to another exemplary embodiment of the disclosure, the slide component slides rearwards to the rear moving position from a second rear moving position (for example, a pop-out position P3 of the embodiment) closer to the front side than the rear moving position, so that the force applying unit stores an applying force which makes the slide component slide forwards.

Effects of the Disclosure

According to the embodiment of the disclosure, even when the slide component is located at the rear moving position and the sliding of the slide component supported at the console main body is locked, the slide component can be moved forwards by using the force applied by the force applying unit when the locking is unlocked. Therefore, for example, even if a passenger having a short stature operates the slide component located at the rear moving position in the state where the position of the seat has been moved forwards in advance, performing the operation in an uncomfortable body posture may be avoided, and the complicated action for simultaneously operating the unlock operating member and the slide component may also be avoided. Furthermore, in a case that the slide locking is unlocked and the slide component is moved forwards by using the applied force of the force applying unit, the slide component can be operated, and accordingly, the operability and usability of the console apparatus for the automobile can be improved.

According to another embodiment of the disclosure, when the passenger unlocks the locking on the slide component at the rear moving position, the passenger may push the unlocking button rearwards by an extension action of an action of stretching out the hand rearwards. Accordingly, the locking on the slide component at the rear moving position can be unlocked, and the slide component is moved forwards by using the applied force of the force applying unit. Therefore, the operability and usability of the console apparatus for the automobile can be further improved.

According to another embodiment of the disclosure, the slide component can be slid rearwards without receiving the applied force of the force applying unit in the process of sliding to the second rear moving position. Furthermore, when locking on the slide component at the rear moving position is unlocked, the slide component can be appropriately moved forwards and stopped at a middle position in the front-rear direction (the second rear moving position).

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 5(a) is a plan view of an unlocking button and the like, and FIG. 5(b) is a cross sectional view taking along 5b-5b of FIG. 5(a).

FIG. 6(a) is a plan view of a front edge portion of an operating concave part and the like, and FIG. 6(b) is a cross sectional view taking along 6b-6b of FIG. 6(a).

FIG. 7(a) is a plan view of an opening handle, and FIG. 7(b) is a cross sectional view taking along 7b-7b of FIG. 7(a).

FIG. 12(a) is a side view of a locking mechanism, and FIG. 12(b) is a side view of a force applying mechanism.

FIG. 13(a) is a side view of the locking mechanism, and FIG. 13(b) is a side view of the force applying mechanism.

DESCRIPTION OF THE EMBODIMENTS

Figure 1:
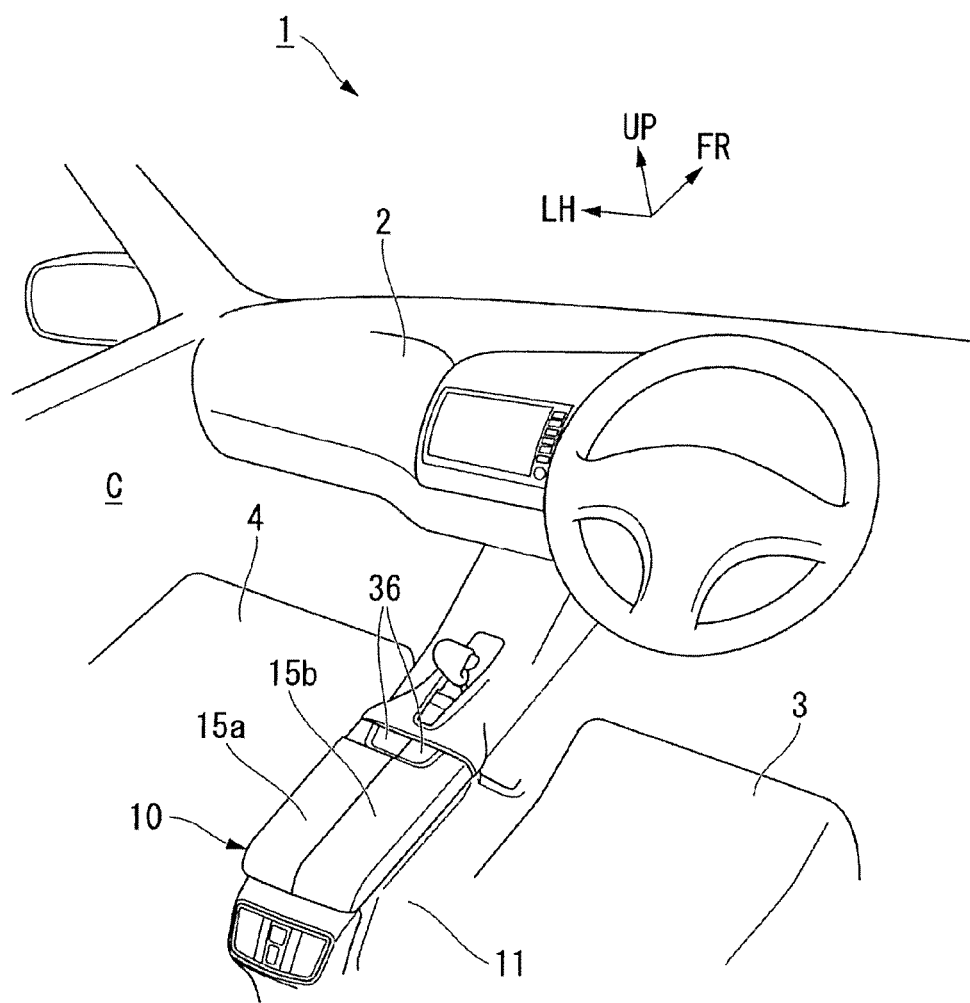
FIG. 1 is a perspective view showing the interior of a compartment of an automobile according to an embodiment of the disclosure.

Embodiments of the disclosure are described below with reference to the drawings. In the following description, directions such as front, rear, left, and right directions are the same as those of the automobile described below, unless otherwise specified. In addition, the arrow FR indicating the front direction of the automobile, the arrow LH indicating the left direction of the automobile, and the arrow UP indicating the upper side of the automobile are marked on appropriate positions in the drawings used in the following description.

As shown in FIG. 1, the automobile 1 includes an instrument panel 2 constituting a front portion of an automobile compartment C, a driver seat 3, a copilot seat 4, and a central console (console apparatus for automobile) 10 arranged between the driver seat 3 and the copilot seat 4.

Figure 2:
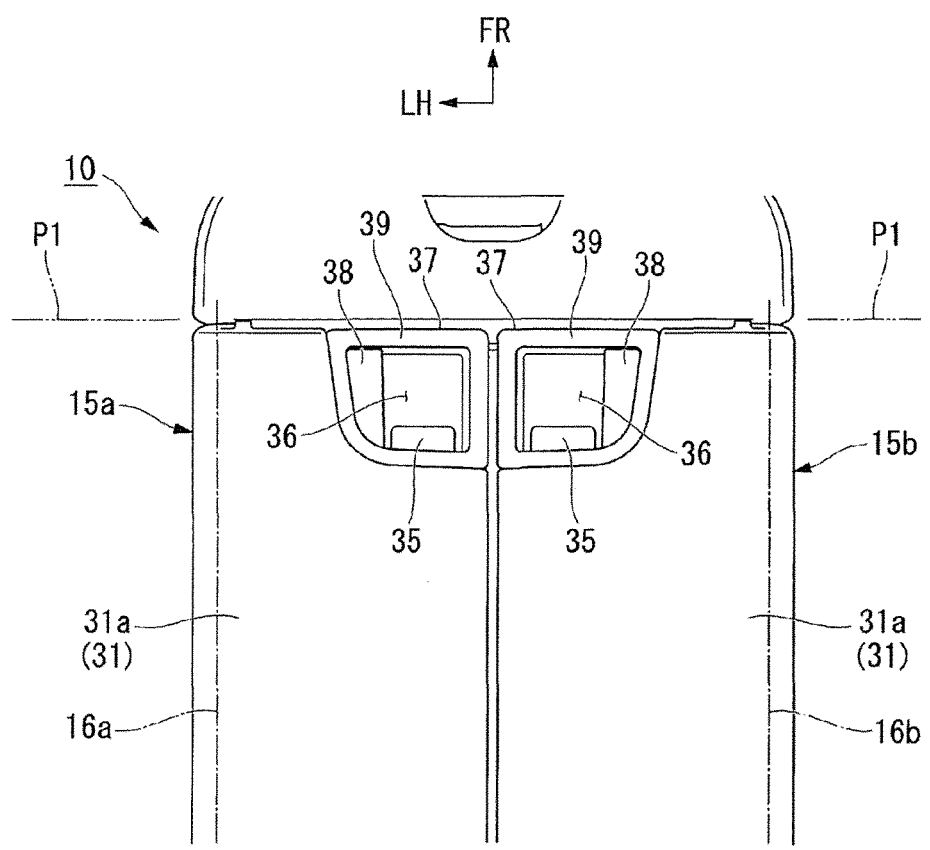
FIG. 2 is a plan view showing a state that a left arm rest and a right arm rest of a central console of the automobile are located at a moving front end position.
Figure 3:
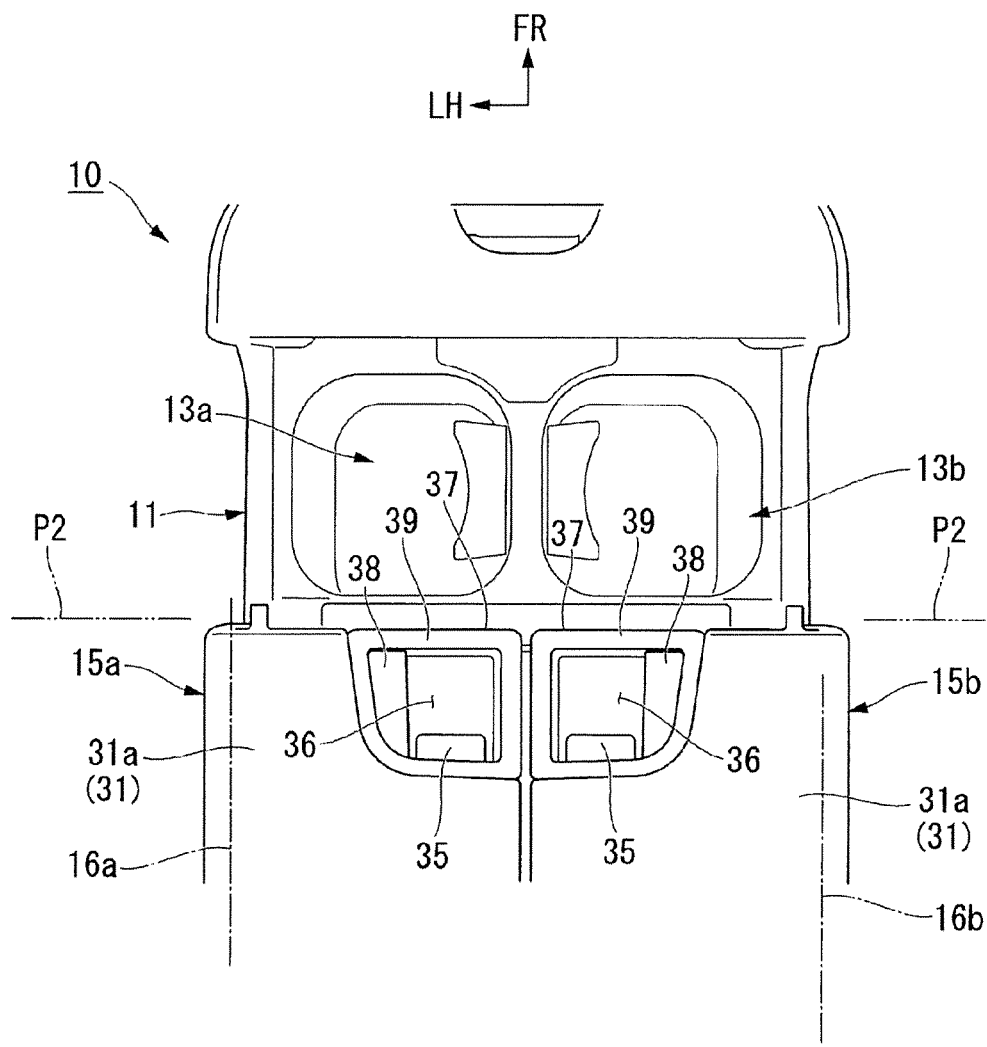
FIG. 3 is a plan view showing the state that the left arm rest and the right arm rest of the central console are located at a moving rear end position.
Figure 4:
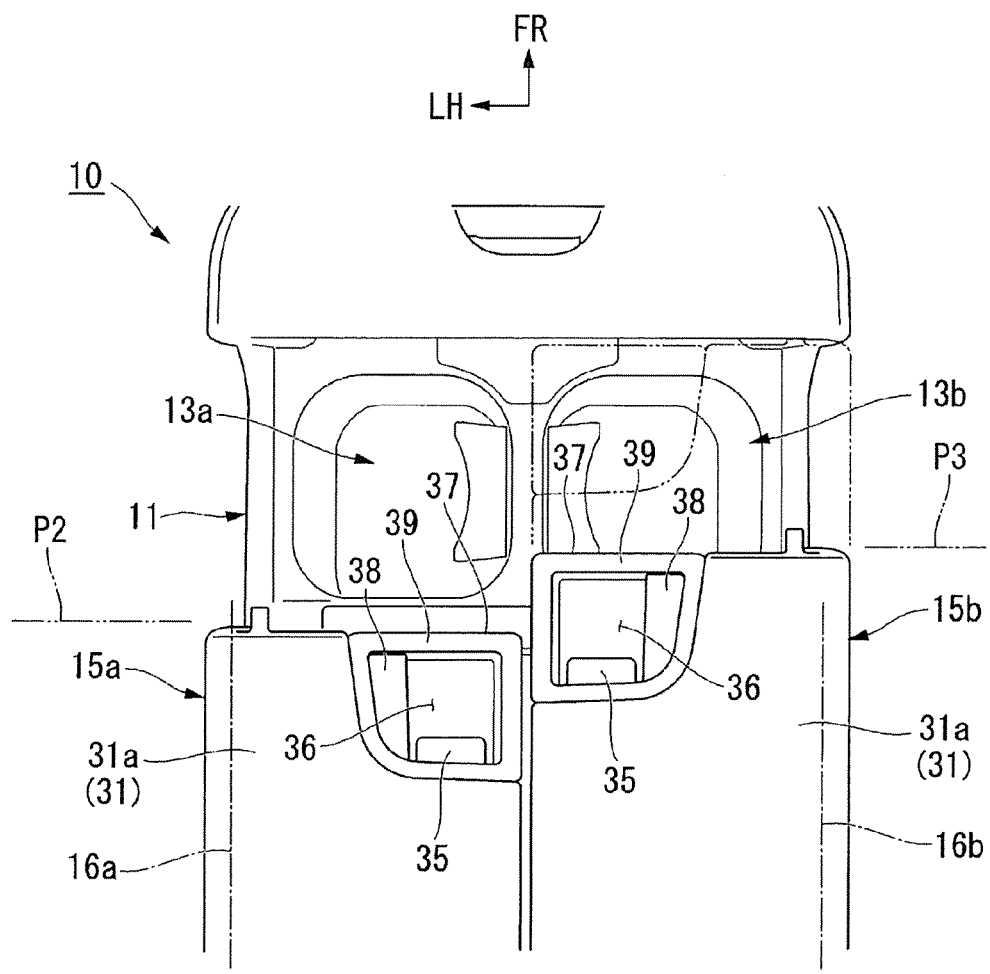
FIG. 4 is a plan view showing the state that the right arm rest slides to a pop-out position from the state shown in FIG. 3.

Referring to FIG. 2 to FIG. 4, the central console 10 includes a console main body 11, and an article receiving part 12 and a pair of left cup holder and right cup holder 13a, 13b forming an upward opening; and a pair of left arm rest and right arm rest (slide components) 15a, 15b, further used as a cover component for opening and closing an upper opening of the console main body 11.

The left and right cup holders 13a, 13b of the console main body 11 are connected with the front side of the article receiving part 12. The left and right arm rests 15a, 15b are arranged in a manner of being capable of sliding in the front-rear direction of the automobile between a moving front end position P1 and a moving rear end position (rear moving position) P2, wherein the moving front end position P1 is a position where the upper openings of the article receiving part 12 and the left and right cup holders 13a, 13b can be closed, and the moving rear end position (rear moving position) P2 is a position where the upper openings of the left and right cup holders 13a, 13b are opened in the closed state of the upper opening of the article receiving part 12.

The left and right arm rests 15a, 15b respectively have a structure symmetric to each other in the left-right direction, and can separately support forearms of passengers seated in the driver seat 3 and the copilot seat 4. The left and right arm rests 15a, 15b can independently slide back and forth. The left and right arm rests 15a, 15b respectively have a hinge shaft (rotating shaft) 16a, 16b along the front-rear direction of the automobile at the outer sides of respective automobile width directions (left-right directions of the automobile). The left and right arm rests 15a, 15b rotate by respectively taking the hinge shafts 16a, 16b as centers, thereby making the article receiving part 12 and the left and right cup holders 13a, 13b opened and closed. In the above description, "a" and "b" are assigned to the reference numbers of the left-right symmetrical structures for distinguishing, but in the following description, the "a" and "b" are omitted if there is no special need.

As shown in FIG. 8 to FIG. 11, the arm rest 15 includes a rotating base 21, supported at the console main body 11 in a manner of being capable of rotating by taking the hinge shaft 16 as the center; and a slide assembly 31, supported at the rotating base 21 in a manner of being capable of sliding in the front-rear direction of the automobile. The upper surface side of the slide assembly 31 is provided with a buffer cushion 31a of the arm rest 15.

The rotating base 21 is supported in a manner of being incapable of moving in the front-rear direction of the automobile relative to the console main body 11. The slide assembly 31 is supported in a manner of being capable of sliding in the front-rear direction of the automobile relative to the rotating base 21 and further relative to the console main body 11.

The rotating base 21 is in a plate-like shape, and is formed in a substantially rectangular shape with long edges along the front-rear direction of the automobile when viewed from top. A shaft supporting part 22 supported by the hinge shaft 16 is arranged at the outer side of the automobile width direction of the rotating base 21 in a protruding manner. Front and rear feet 23, 24 connected with the upper portion of the console main body 11 are arranged at the inner side of the automobile width direction of the rotating base 21. A pair of front and rear slide position ribs 25, 26 and a pop-out component collision part 27 are arranged at the upper surface of the rotating base 21 in a protruding manner.

The slide assembly 31 has a plate-like slide base 32 longer than the rotating base 21 in the front-rear direction. The slide base 32 is formed in a substantially rectangular shape with long edges along the front-rear direction of the automobile when viewed from top. The slide base 32 is arranged in a way of being stacked on the rotating base 21 from top.

Figure 10:
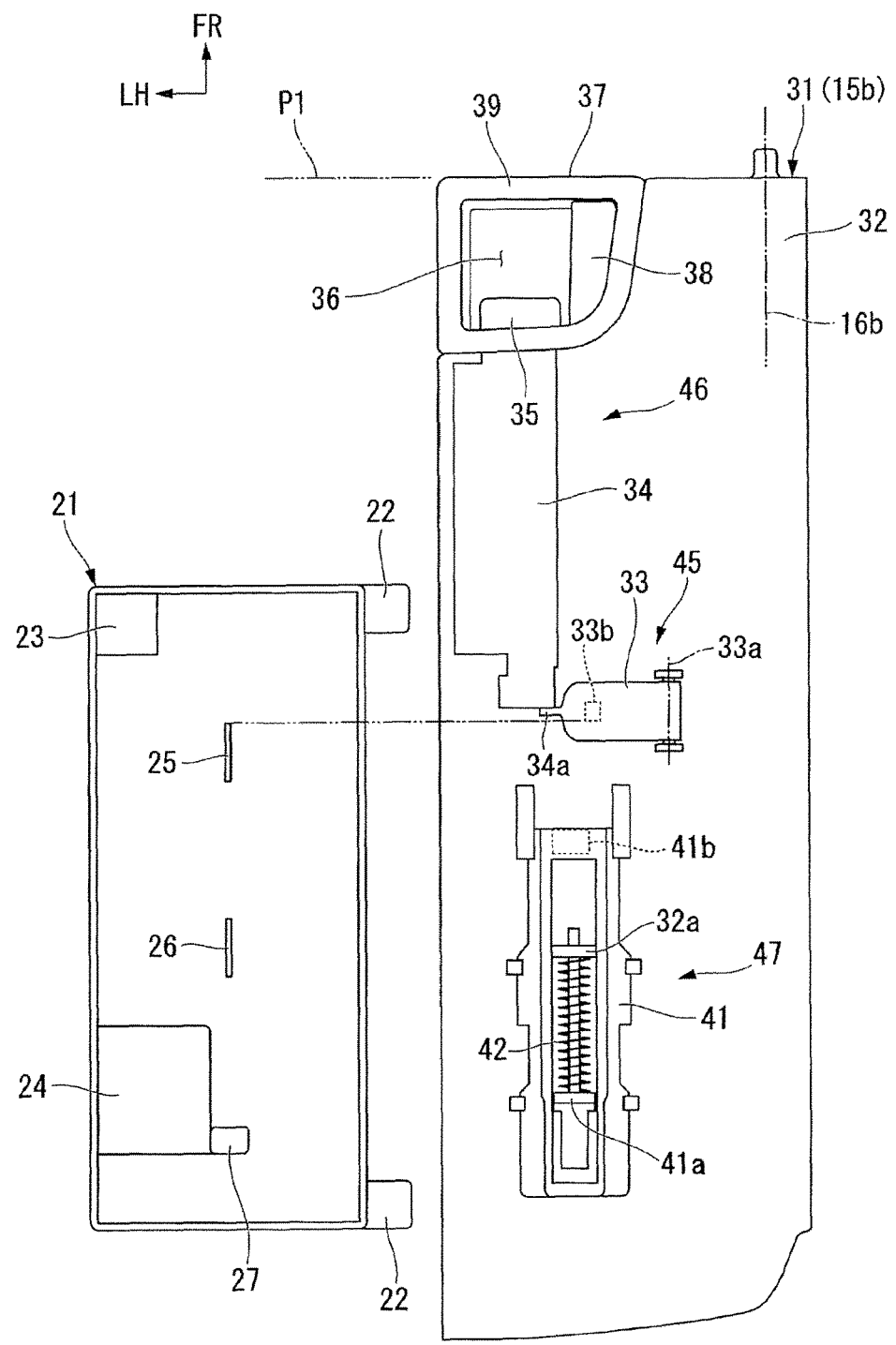
FIG. 10 is a plan view of a slide assembly and a rotating base of the arm rest.
Figure 11:
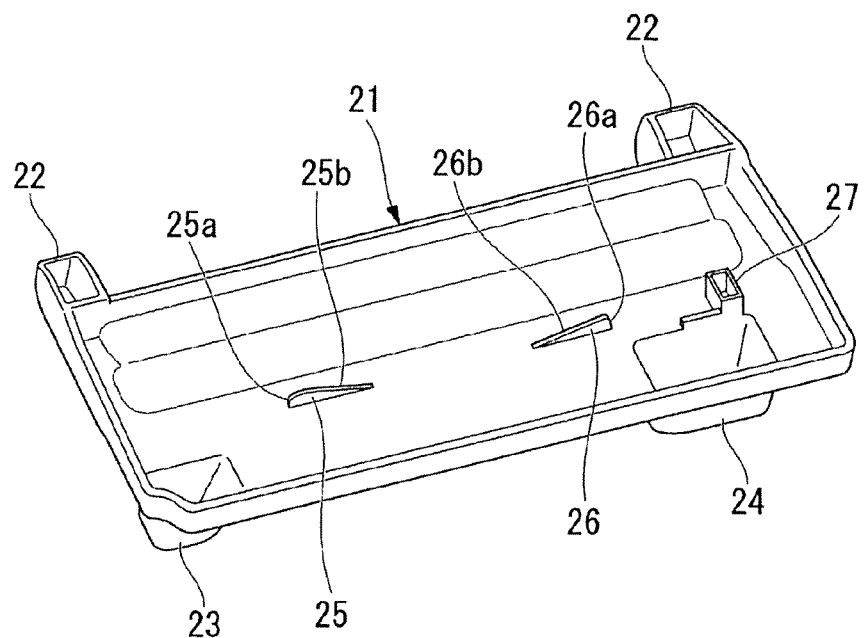
FIG. 11 is a perspective view of the rotating base.
Figure 11:
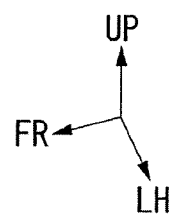

Referring to FIG. 10, the arm rest 15 includes a locking mechanism 45, locking the forward slide of the arm rest 15 when the arm rest 15 (slide assembly 31) is located at the moving rear end position P2; an unlocking mechanism 46, unlocking the locking on the arm rest 15 by the lock mechanism 45 at the moving rear end position P2 according to an unlocking operation; and a force applying mechanism 47, applying a forward force to the arm rest 15 when the arm rest 15 is located at the moving rear end position P2, and making the arm rest 15 slide forwards when the locking on the arm rest 15 at the moving rear end position P2 is unlocked.

The locking mechanism 45 includes a slide stopper 33, arranged on the slide base 32 in a manner of being capable of swinging by taking a swing axis 33a along the front-rear direction of the automobile as a center; and front and rear slide position ribs 25, 26, arranged on the rotating base 21 in a protruding manner.

Figure 12A:
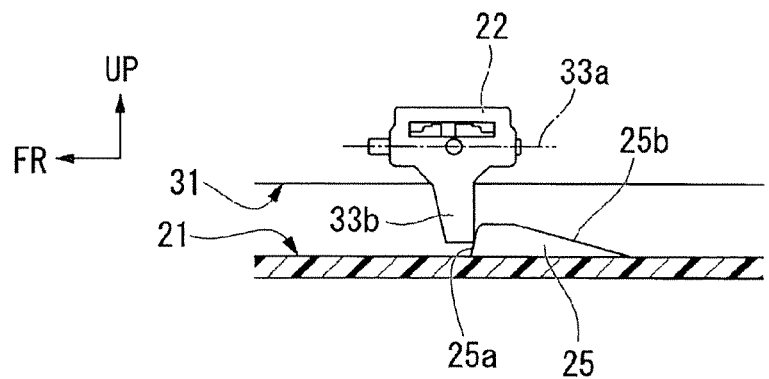
FIG. 12(a) and FIG. 12(b) are illustrative diagrams showing a slide lock state of the arm rest at the moving front end position.
Figure 13A:
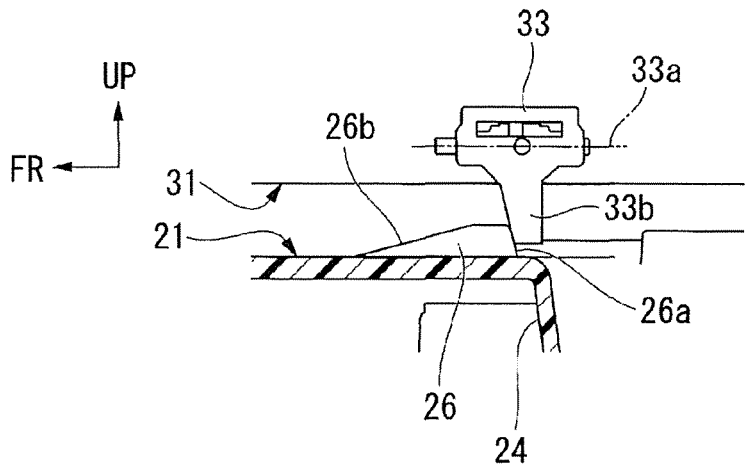
FIG. 13(a) and FIG. 13(b) are illustrative diagrams showing a slide lock state of the arm rest at the moving rear end position.

Referring to FIG. 12(a) and FIG. 13(a), the slide stopper 33 has an engaging claw 33b protruding towards the bottom of the slide base 32. The slide stopper 33 is subjected to force applying, so that the engaging claw 33b protrudes towards the bottom of the slide base 32, and the slide stopper 33 can resist the applied force and make the engaging claw 33b avoid upwards.

The front slide position rib 25 is forwardly engaged with the engaging claw 33b (referring to FIG. 12(a)) protruding towards the bottom of the slide base 32 when the arm rest 15 is located at the moving front end position P1, and thereby the rearward slide of the arm rest 15 is locked. The front slide position rib 25 includes: a front limiting edge portion 25a, forwardly abutting the engaging claw 33b of the slide stopper 33; and a rear inclined edge portion 25b, jacking up the engaging claw 33b in a process of making the arm rest 15 move towards the moving front end position P1.

The rear slide position rib 26 is backwardly engaged with the engaging claw 33b (referring to FIG. 13(a)) protruding towards the bottom of the slide base 32 when the arm rest 15 is located at the moving rear end position P2, and thereby the forward slide of the arm rest 15 is locked. The rear slide position rib 26 includes: a rear limiting edge portion 26a, backwardly abutting the engaging claw 33b of the slide stopper 33; and a front inclined edge portion 26b, jacking up the engaging claw 33b in a process of making the arm rest 15 move towards the moving rear end position P2.

Referring to FIG. 10, the unlocking mechanism 46 includes a lock slider 34, arranged on the slide base 32 in a planner of being capable of sliding in the front-rear direction of the automobile; and an unlocking button 35, connected with the front end of the lock slider 34. The unlocking mechanism 46 can slide with the slide base 32 integrally in the front-rear direction of the automobile. The lock slider 34 is applied with a forward force relative to the slide base 32, and can resist the applied force to slide rearwards for a specified distance relative to the slide base 32.

The rear end portion of the lock slider 34 is engaged with the slide stopper 33 through a cam mechanists 34a. The lock slider 34 moves rearwards relative to the slide base 32, and then the slide stopper 33 swings against the applied force. At the moment, the engaging claw 33b of the slide stopper 33 is pushed upwards from the engaged position of the front and rear slide position ribs 25, 26 so as to perform the avoidance. Thus, the engagement of the engaging claw 33b relative to the front and rear slide position ribs 25, 26 is released, and accordingly, the locking on the front-rear slide of the arm rest 15 by the lock mechanism 45 is unlocked.

Figure 5A:
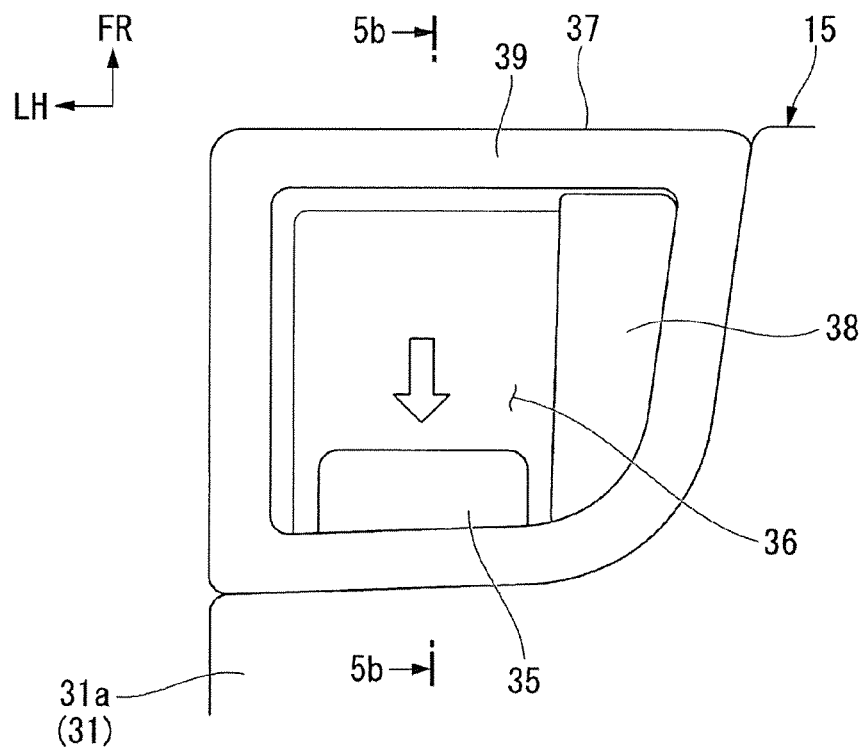
FIG. 5(a) and FIG. 5(b) are illustrative diagrams showing slide unlocking operations of the arm rests.
Figure 5B:
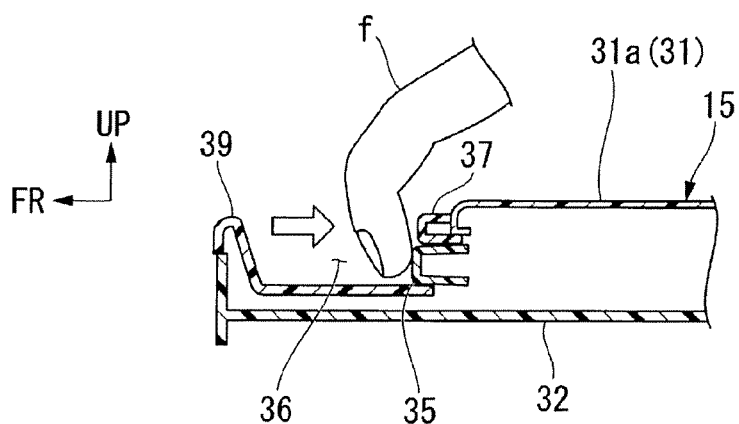

Referring to FIG. 5(a) and FIG. 5(b), the unlocking button 35 is an operating member as follows: by pressing the unlocking button 35 rearwards, the lock slider 34 is moved rearwards, and the locking on the front-rear slide of the arm rest 15 by the locking mechanism 45 is unlocked.

Herein, an operating concave part 36 provided for the passenger to open and close the arm rest 15 is arranged at the inner side of the width direction of the automobile of the front end portion of the arm rest 15. The operating concave part 36 is formed by a garnish 37. The garnish 37 avoids the buffer cushion 31a of the arm rest 15 to be mounted to the slide base 32. The garnish 37 is in a substantially rectangular shape when viewed from top, and the unlocking button 35 protrudes towards the interior of the operating concave part 36 from the rear edge portion of the garnish 37.

Figure 6A:
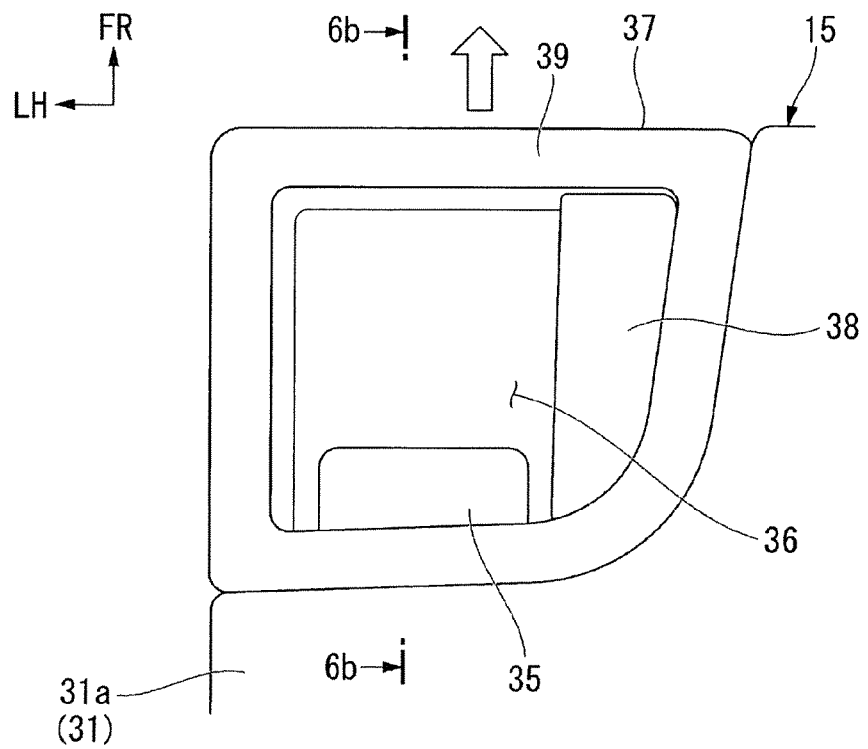
FIG. 6(a) and FIG. 6(b) are illustrative diagrams showing operation making the arm rests slide forwards.
Figure 6B:
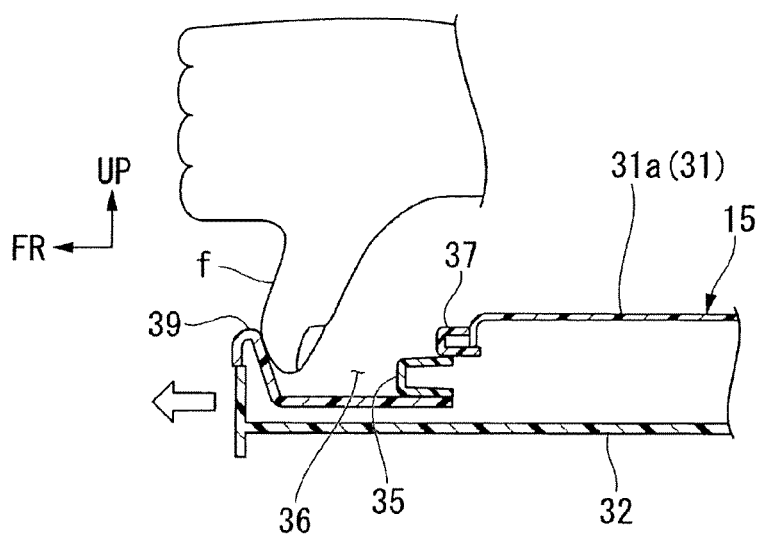

Referring to FIG. 6(a) and FIG. 6(b), the outer side edge portion of the garnish 37 is provided with an opening handle 38 for opening the arm rest 15 with the hinge shaft 16 as the center. The rotation of the arm rest 15 with the hinge shaft 16 as the center is locked in the state that the upper opening of the article receiving part 12 is closed. The opening handle 38 is rotated in an upwards pulling manner with fingers and the like, so that locking on the rotation of the arm rest 15 with the hinge shaft 16 as the center is unlocked. The opening handle 38 directly functions as a handle for opening the arm rest 15 with the hinge shaft 16 as the center after the unlocking operation.

Figure 7A:
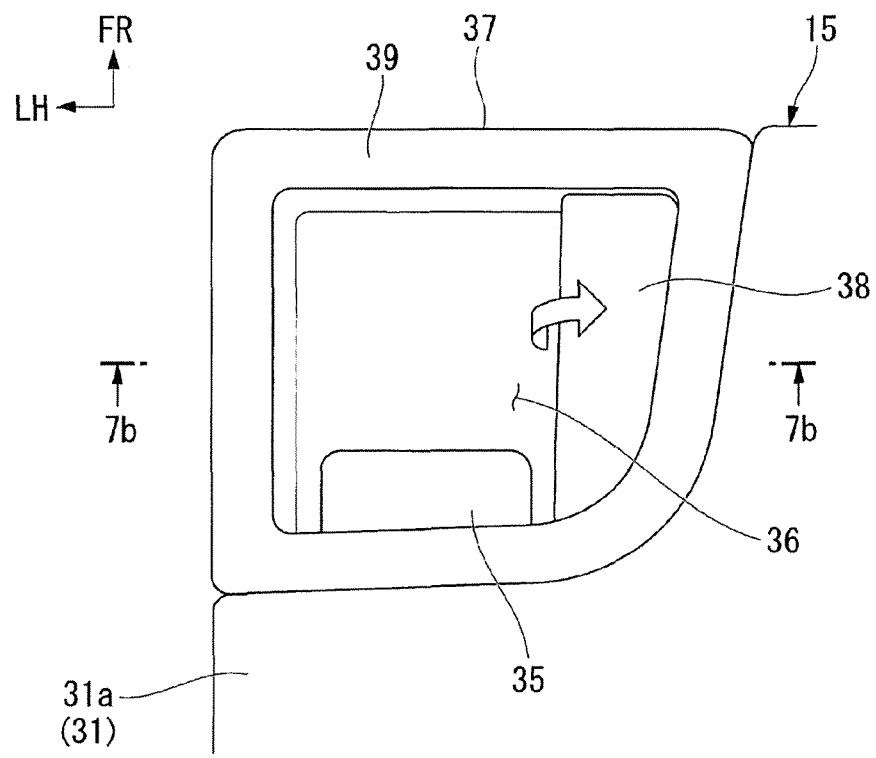
FIG. 7(a) and FIG. 7(b) are illustrative diagrams showing a hinge opening operation of the arm rests.
Figure 7B:
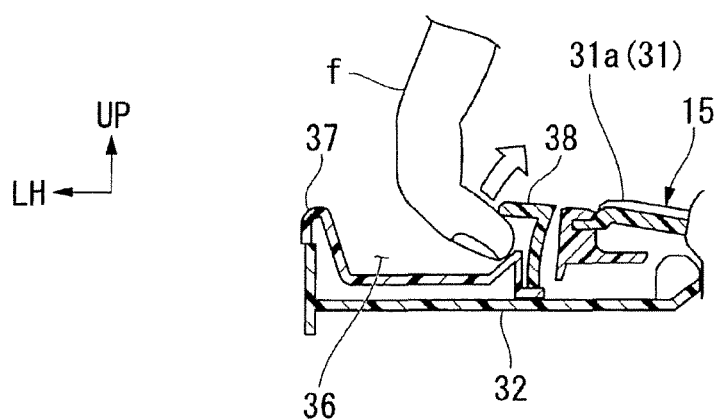

Referring to FIG. 7(a) and FIG. 7(b), the front edge portion 39 of the garnish 37 functions as a handle to make the arm rest 15 slide forwards.

Referring to FIG. 10, the force applying mechanism 47 includes a pop-out component 41, arranged on the slide base 32 in a manner of being capable of sliding in the front-rear direction of the automobile; a force applying spring 42, arranged at, for example, the inner side of the pop-out component 41; and the pop-out component collision part 27, arranged on the rotating base 21 in a protruding manner.

The pop-out component 41 applies a rearward force via the force applying spring 42, and can slide forwards for a specified distance against the applied force.

Figure 12B:
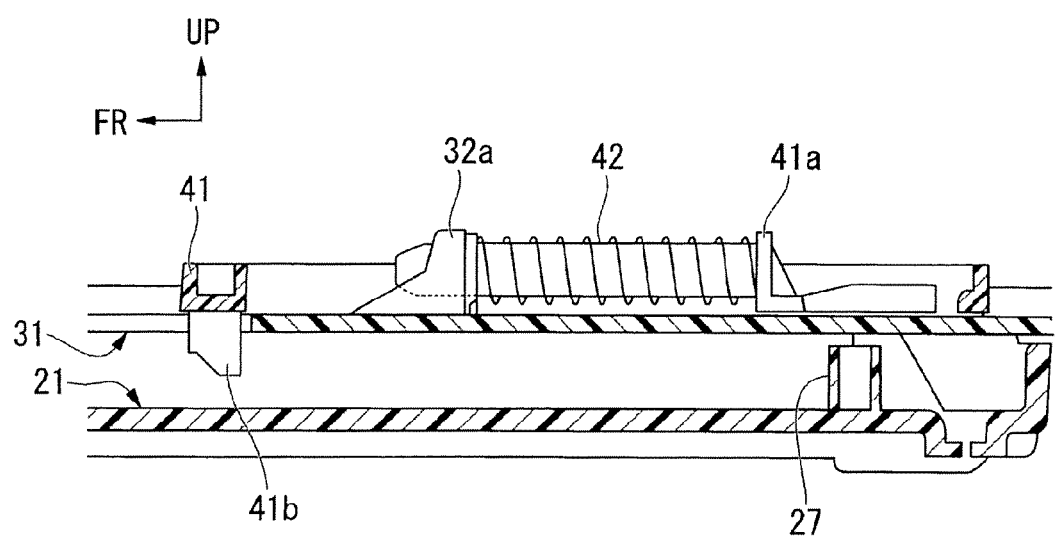
Figure 13B:
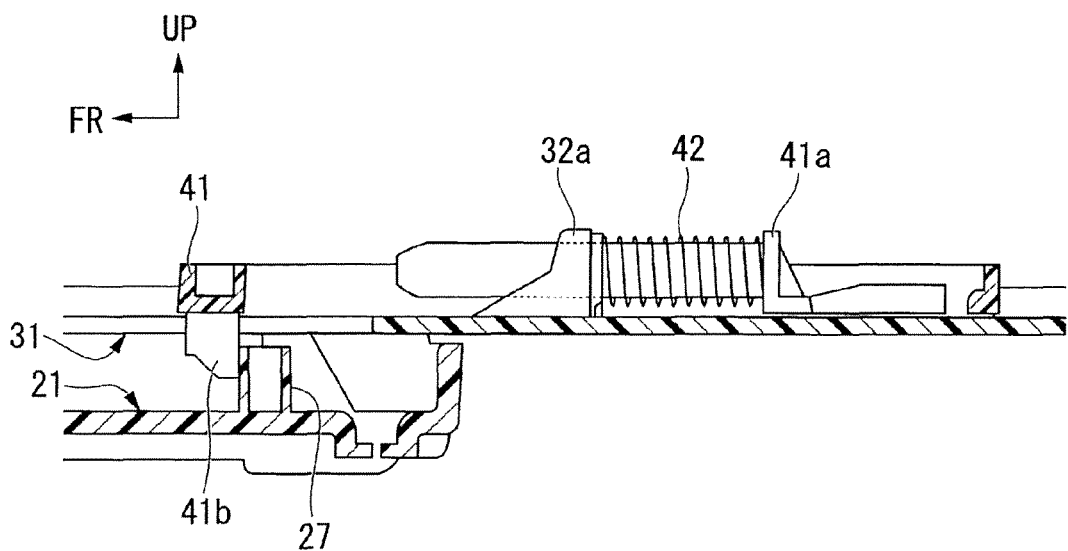

Referring to FIG. 12(b) and FIG. 13(b), for example, the force applying spring 42 is a compressive spiral spring with an axial direction (stretching direction) along the front-rear direction of the automobile. The force applying spring 42 is compressively connected between a spring rear end supporting portion 41a arranged at the pop-out component 41 and a spring front end supporting portion 32a arranged on the slide base 32 in a protruding manner. An external engaging claw 41b protruding to the bottom of the slide base 32 is arranged below the front end portion of the pop-out component 41 in a protruding manner.

The external engaging claw 41b is moved forwards away from the pop-out component collision part 27 (referring to FIG. 12(b) of the rotating base 21 when the arm rest 15 is located at the moving front end position P1.

The external engaging claw 41b forwardly abuts and is engaged with the pop-out component collision part 27 of the rotating base 21 when the arm rest 15 moves to a pop-out position (second rear moving position) P3 slightly closer to the rear side than the center in a slide range. If the arm rest 15 is further moved to the moving rear end position P2 from the state described above, the pop-out component 41 may move forwards relative to the slide base 32, and the force applying spring 42 may be compressed in an amount of making the arm rest 15 move from the pop-out position P3 to the moving rear end position P2 (referring to FIG. 13(*b*)). That is, partial force needed for the rearward movement of the arm rest 15 is stored in the force applying spring 42.

After the arm rest 15 reaches the moving rear end position P2, the arm rest 15 is jacked up by the front inclined edge portion 26*b* of the rear slide position rib 26 to a position where the engaging claw 33*b* of the slide stopper 33 on the rear slide position rib 26 is descended to an engaging position with the rear limiting edge portion 26*a* of the rear slide position rib 26 (referring to FIG. 13(*a*)). Therefore, the engaging claw 33*b* is engaged with the rear limiting edge portion 26*a* of the rear slide position rib 26, and the forward movement of the slide base 32 relative to the rotating base 21 (further the forward motion of the arm rest 15) is limited. At the moment, the force applying spring 42 applies a forward force to the slide base 32.

If the unlocking button 35 is pressed rearwards in the above-mentioned state, the restriction of the engaging claw 33*b* of the slide stopper 33 on the forward movement of the slide base 32 is released, and the force applied by the force applying spring 42 is released. Thus, as shown in FIG. 4, the slide base 32 leaps (pops out) to the pop-out position P3. At the moment, the slide base 32 moves forwards under the applied force until reaching the pop-out position P3. When the slide base 32 is located at the pop-out position P3, the arm rest 15 goes forward until the front end portion of the slide base 32 is overlapped with the rear end portion of the cup holder 13. The slide base 32 can go forward to the position closer to the front side than the pop-out position P3 only by means of the inertia. Therefore, the popped slide base 32 can go forward in a way of going beyond the pop-out position P3 when the cup holder 13 is not used, and can be stopped against a container and the like only because the cup holder 13 is used.

Secondly, the effect of the embodiment is described.

As shown in FIG. 2, in the state that the arm rest 15 is located at the moving front end position P1, when the passenger opens the arm rest 15 through the rearward slide, first, as shown in FIG. 5(*a*) and FIG. 5(*b*), the unlocking button 35 at the inner rear end of the operating concave part 36 is pressed rearwards by using the finger f of the passenger. Thus, the rearward slide of the arm rest 15 locked by the locking mechanism 45 is unlocked. At the moment, the passenger can use the extension action of stretching out the hand rearwards relative to the arm rest 15 at the moving rear end position P2 to push the unlocking button 35 rearwards, so that the unlocking operation is easy.

Then, the passenger rearwards pushes the arm rest 15 to make the arm rest 15 slide by using the extension action of pressing the unlocking button 35, thereby the cup holder 13 can be exposed to be used. At the moment, in the process of making the arm rest 15 move to the moving rear end position P2, the force applying mechanism 47 stores the forward force applied to the arm rest 15. The arm rest 15 can slide rearwards without receiving the repelling force of the force applying spring 42 until reaching the pop-out position P3, so that the opening operation of the arm rest 15 is smooth. When the arm rest 15 slides to the moving backward position, the forward movement of the arm rest 15 is automatically limited through the locking mechanism 45.

As shown in FIG. 3, in the state that the arm rest 15 is located at the moving rear end position P2, when the passenger closes the arm rest 15 through forwards sliding, as in the case of rearwards sliding the armrest 15, as shown in FIG. 5(*a*) and FIG. 5(*b*), the unlocking button 35 at the inner rear end of the operating concave part 36 is pressed rearwards by using the finger f of the passenger. Thus, the locking on the forward slide of the arm rest 15 by the lock mechanism 45 is unlocked.

After the forward slide of the arm rest 15 is unlocked, the arm rest 15 is automatically popped forwards by using the force applied by the force applying mechanism 47. Therefore, the passenger can put a hand on the front end portion of the arm rest 15 which is moved forwards from the moving rear end position P2 to a certain extent, so as to forwards pull the arm rest (referring to FIG. 6(*a*) and FIG. 6(*b*)).

Figure 8:
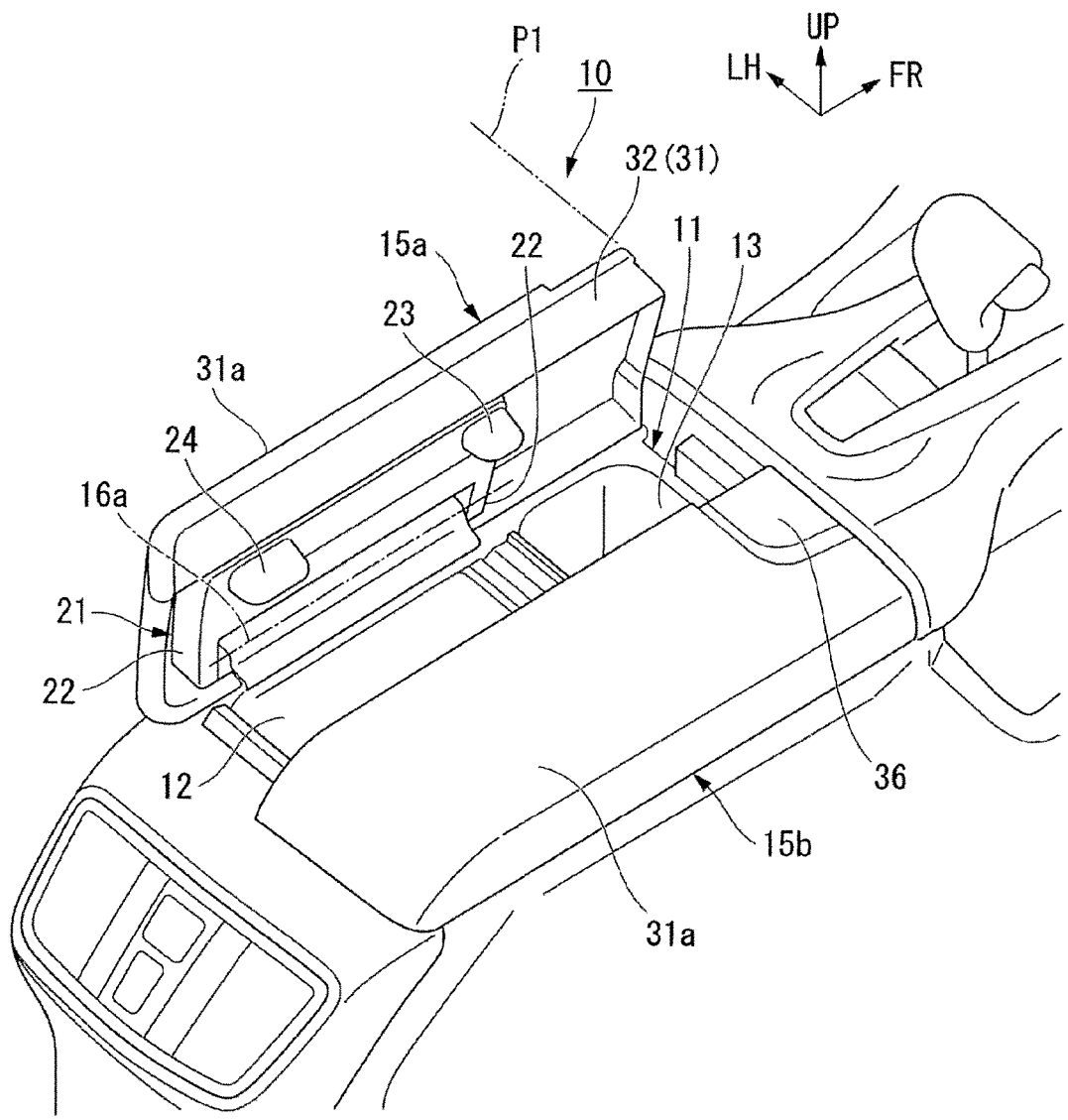
FIG. 8 is a perspective view showing the state that the right arm rest located at the moving front end position is subjected to the hinge open operation.
Figure 9:
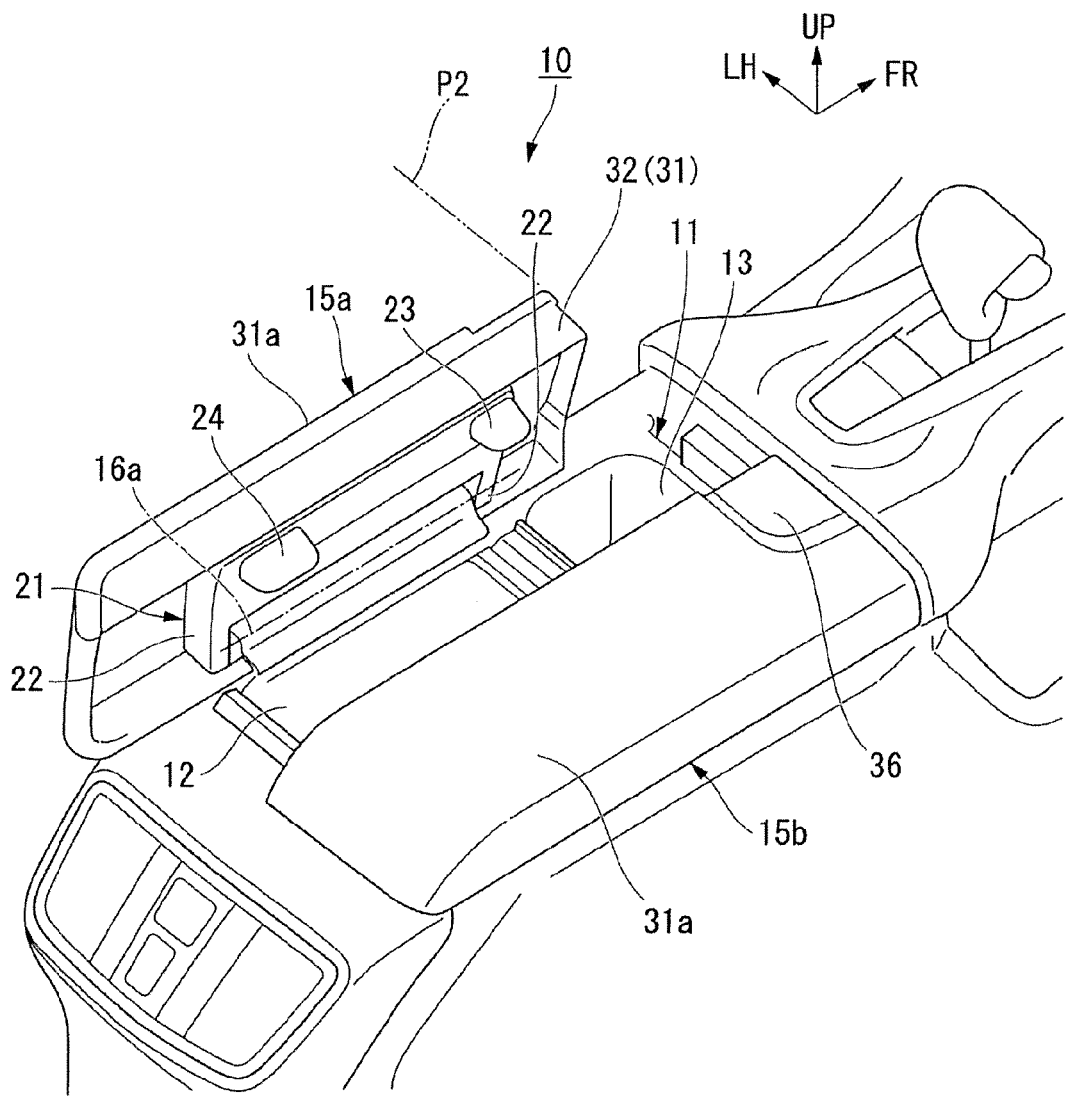
FIG. 9 is a perspective view showing the state that the right arm rest located at the moving rear end position is subjected to the hinge open operation.

As shown in FIG. 8 and FIG. 9, when the arm rest 15 is opened through the rotation with the hinge shaft 16 as the center, as shown in FIG. 7(*a*) and FIG. 7(*b*), the opening handle 38 at the outer side of the width direction of the automobile in the operating concave part 36 is pulled upwards through the finger f of the passenger. Thus, the locking on the rotation of the arm rest 15 with the hinge shaft 16 as the center is unlocked. Then, the passenger uses the extension action of pulling the opening handle 38 to make the arm rest 15 rotate upward, and thereby the cup holder 13 and the article receiving part 12 can be exposed to be used.

As described above, the console apparatus (central console 10) includes: the console main body 11, disposed between the driver seat 3 and the copilot seat 4 of the automobile 1; the arm rest 15, supported at the console main body 11 in a manner of sliding in the front-rear direction of the automobile; the locking mechanism 45, locking the forward slide of the arm rest 15 when the arm rest 15 is located at the moving rear end position P2; the unlocking mechanism 46, unlocking the arm rest 15 locked by the locking mechanism 45 at the moving rear end position P2 according to the unlocking operation; and the force applying mechanism 47, applying the forward force to the arm rest 15 when the arm rest 15 is located at the moving rear end position P2, and making the arm rest 15 slide forwards when the locking on the arm rest 15 at the moving rear end position P2 is unlocked.

According to the structure described above, even when the arm rest 15 is located at the moving rear end position P2, and the slide of the arm rest 15 supported at the console main body 11 is locked, the arm rest 15 can be moved forwards by using the force applied by the force applying mechanism 47 when the unlocking process is performed. Therefore, for example, even if a passenger having a short stature operates the arm rest 15 at the moving rear end position P2 in the state that the position of the seat is moved forwards, performing the operation in an uncomfortable body posture may be avoided, and the complicated action for simultaneously operating the unlock operating member and the arm rest 15 can also be avoided. Furthermore, in a case that the slide locking is unlocked and the arm rest 15 is moved forwards by using the force applied by the force applying mechanism 47, the arm rest 15 can be operated, and accordingly, the operability and usability of the console apparatus for the automobile can be improved.

In the console apparatus for the automobile in the above-mentioned embodiment, the unlocking mechanism 46 has the unlocking button 35, and locking on the arm rest 15 at the moving rear end position P2 is unlocked by pressing the unlocking button 35 rearwards.

According to the structure described above, when the locking on the arm rest 15 at the moving rear end position P2 is unlocked by the passenger, the extension action of stretching out the hand rearwards can be used for pressing the unlocking button 35 rearwards. Thus, the locking on the arm rest 15 at the moving rear end position P2 can be unlocked, and the arm rest 15 is moved forwards by using the force applied by the force applying mechanism 47. Therefore, the operability and usability of the console apparatus for the automobile can be further improved.

In the console apparatus for the automobile of the embodiment, the arm rest 15 is moved rearwards to the moving rear end position P2 from the pop-out position P3 closer to the front side than the moving rear end position P2, thereby the force applying mechanism 47 stores the applied force which makes the arm rest 15 slide forwards.

According to the structure described above, the arm rest 15 can slide rearwards without receiving the applied force of the force applying mechanism 47 in the process of sliding to the pop-out position P3. Furthermore, when the locking on the arm rest 15 at the moving rear end position P2 is unlocked, the arm rest 15 can be appropriately moved forwards and stopped at a middle position (pop-out position P3) in the front-rear direction.

Moreover, the disclosure is not limited to the embodiment described above, for example, the disclosure is not limited to the central console between the let' and right seats of the front row separated seats, and is also applicable to a console between the left and right seats of rear row separated seats. Furthermore, the disclosure is also applicable to a console apparatus having no cup holder and article receiving part or having different functional parts. Furthermore, the disclosure is also applicable to a console apparatus comprising a slide component that is not the arm rest. Furthermore, the slide component is not limited to the separated bodies in bilateral symmetry, but also can be separated bodies asymmetric to each other in the left-right direction, or more than three separated bodies that are further a left-right integrated component. Furthermore, if a locking unit, an unlocking unit and a force applying unit having the same functions as that of the locking mechanism 45, the unlocking mechanism 46 and the force applying mechanism 47 are provided, the detail structures of these units are not limited, and electrical control can also be included. Furthermore, the locking unit can also lock the forward slide of the slide component (the locking is performed by maintaining the rearward displacement) at the rear moving position closer to the front side than the moving rear end position of the slide component. Furthermore, the force applying unit can also apply force to the slide component until the slide component goes beyond the center position of the slide range or until the slide component is moved to the moving front end position.

Moreover, the structure in the embodiment described above is an example of the disclosure, and various changes can be made without departing from the spirit scope of the disclosure, for example, the structural elements of the embodiment are substituted by well-known structural elements and the like.

What is claimed is:

1. A console apparatus for an automobile, comprising:
   a console main body, arranged between a left seat and a right seat of the automobile;
   a slide component, supported at the console main body in a manner of being capable of sliding in a front-rear direction of the automobile;
   a locking unit, locking a forward slide of the slide component when the slide component is located at a rear moving position;
   an unlocking unit, unlocking the slide component locked by the locking unit at the rear moving position according to an unlocking operation; and
   a force applying unit, applying a forward force to the slide component when the slide component is located at the rear moving position, and making the slide component slide forwards when the locking of the slide component at the rear moving position is unlocked,
   wherein the slide component slides rearwards to the rear moving position from a second rear moving position closer to a front side than the rear moving position, so that the force applying unit stores an applying force which makes the slide component slide forwards,
   wherein the force applying unit applies a force to a middle position between the rear moving position and a front end position of the slide component.

2. The console apparatus for the automobile according to claim 1, wherein
   the unlocking unit comprises an unlocking button, and the locking of the slide component at the rear moving position is unlocked by pushing the unlocking button rearwards.

3. The console apparatus for the automobile according to claim 1, wherein
   after the slide component reaches the rear moving position, an engaging claw disposed at the slide component side rides on an engaging portion disposed at the console main body side and descends to an engaging position, the locking unit is locked when the engaging claw abuts against the engaging portion,
   an abutting portion of the engaging claw and the engaging portion is formed to be inclined rearward as the abutting portion goes downward.

4. The console apparatus for the automobile according to claim 1, wherein
   the force applying unit is set to an applying force that stops the slide component at the middle position.

* * * * *